(12) United States Patent
Kondo et al.

(10) Patent No.: US 7,623,970 B2
(45) Date of Patent: Nov. 24, 2009

(54) PERSONAL AUTHENTICATION METHOD AND DEVICE

(75) Inventors: Kenji Kondo, Hirakata (JP); Kenya Uomori, Hirakata (JP)

(73) Assignee: Panasonic Corporation, Osaka (JP)

( * ) Notice: Subject to any disclaimer, the term of this patent is extended or adjusted under 35 U.S.C. 154(b) by 14 days.

(21) Appl. No.: 10/120,694

(22) Filed: Apr. 11, 2002

(65) Prior Publication Data

US 2002/0152034 A1 Oct. 17, 2002

(30) Foreign Application Priority Data

Apr. 17, 2001 (JP) .............................. 2001-117850

(51) Int. Cl.
*G01N 33/48* (2006.01)

(52) U.S. Cl. .............................. 702/19; 700/30; 706/45; 707/3; 707/6; 707/102; 707/104.1; 726/2; 726/28

(58) Field of Classification Search .................... 702/19; 704/246, 249; 382/115, 116
See application file for complete search history.

(56) References Cited

U.S. PATENT DOCUMENTS

| | | | | | |
|---|---|---|---|---|---|
| 5,630,125 | A | * | 5/1997 | Zellweger ................ | 707/103 R |
| 5,930,804 | A | * | 7/1999 | Yu et al. ................... | 707/104.1 |
| 6,072,891 | A | | 6/2000 | Hamid et al. | |
| 6,219,639 | B1 | * | 4/2001 | Bakis et al. .................. | 704/246 |
| 6,591,224 | B1 | * | 7/2003 | Sullivan et al. ............. | 702/179 |
| 7,305,562 | B1 | * | 12/2007 | Bianco et al. ............... | 713/186 |
| 2002/0184538 | A1 | * | 12/2002 | Sugimura et al. ........... | 713/202 |
| 2003/0105725 | A1 | * | 6/2003 | Hoffman ..................... | 705/75 |

FOREIGN PATENT DOCUMENTS

| | | | |
|---|---|---|---|
| EP | 0 956 818 | A1 | 11/1999 |
| EP | 1 081 632 | A1 | 3/2001 |
| FR | 2 634 570 | | 1/1990 |
| GB | 2 342 744 | A | 4/2000 |
| JP | 08-016788 | | 1/1996 |
| JP | 09-212644 | | 8/1997 |
| JP | 11-253426 | | 9/1999 |
| JP | 11-306351 | | 11/1999 |
| JP | 11-306352 | | 11/1999 |
| JP | 2000-122975 | A | 4/2000 |
| JP | 2000-242786 | | 9/2000 |
| JP | 2000-311220 | A | 11/2000 |
| JP | 2001-021309 | A | 1/2001 |
| JP | 2001-052181 | A | 2/2001 |
| JP | 2001-101406 | A | 4/2001 |

OTHER PUBLICATIONS

"Biometry", Merriam-Webster Online Dictionary, website on world wide web at m-w.com/cgi-bin/dictionary?book=Dictionary&va=biometric, 2004, Merriam-Webster Incorporated, p. 1.*
"password" definition, Merriam-Webster online dictionary, 2005, on the world wide web at http://www.m-w.com/cgi-bin/dictionary?book=Dictionary&va=password, 2 pages.*

* cited by examiner

*Primary Examiner*—Carolyn Smith
(74) *Attorney, Agent, or Firm*—Harness, Dickey & Pierce, P.L.C.

(57) ABSTRACT

A personal authentication method capable of selecting types of biological information used for authentication flexibly depending on the user and the environment is provided. During registration, a plurality of types of biological information are acquired from the user, feature information is extracted from the acquired biological information, and authentication precision is estimated for each combination of pieces of feature information. During authentication, at least one type of biological information is acquired from the user, feature information is extracted from the acquired biological information, authentication is performed by comparing the acquired feature information with the feature information extracted from the biological information during registration, and operation of the user is controlled according to the authentication precision.

5 Claims, 9 Drawing Sheets

<Authentication>

| Combination of biological features | Authentication precision | FAR |
|---|---|---|
| Fingerprint, iris, face, voiceprint, handwriting | 99.00% | 1.0% |
| Iris, face, voiceprint, handwriting | 99.99% | 0.01% |
| Iris, face, voiceprint | 99.95% | 0.05% |
| ... | ... | ... |
| Fingerprint | 93.00% | 7.0% |
| Iris | 99.90% | 0.1% |
| Face | 99.00% | 1.0% |
| Voiceprint | 97.00% | 3.0% |

FIG. 8

| Combination of biological features | Authentication precision | Entrance-permitted room |
|---|---|---|
| Fingerprint, iris, face, voiceprint, handwriting | 99.999% | A,B,C,D,E |
| Iris, face, voiceprint, handwriting | 99.990% | B,C,D,E |
| Iris, face, voiceprint | 99.950% | B,C,D,E |
| ... | ... | ... |
| Iris | 99.900% | C,D,E |
| Fingerprint | 99.000% | D,E |
| Face | 97.000% | E |
| Voiceprint | 90.000% | E |

FIG. 10

| Combination of biological features | Authentication precision | Upper amount limit in commerce |
|---|---|---|
| Fingerprint, iris, face, voiceprint, handwriting | 99.999% | 500万円 |
| Iris, face, voiceprint, handwriting | 99.990% | 300万円 |
| Iris, face, voiceprint | 99.950% | 200万円 |
| ... | ... | ... |
| Iris | 99.900% | 150万円 |
| Fingerprint | 99.000% | 50万円 |
| Face | 97.000% | 5万円 |
| Voiceprint | 90.000% | 1万円 |

PERSONAL AUTHENTICATION METHOD AND DEVICE

BACKGROUND OF THE INVENTION

The present invention relates to a technology of personal authentication using biological information, and more particularly, to a technology of performing personal authentication based on a plurality of types of biological information in an integrated manner.

In recent years, with the development of electronic commerce on a network, increased importance of control of entrance/exit into/from a place requiring physical security, and the like, personal authentication technology has received attention. Among others in the personal authentication technology, particular attention has been focused on individual identification techniques using information on human biological features (biometrics). As usable biological features, a fingerprint, an iris, a blood-vessel arrangement in a retina, a face, a voiceprint and the like have been proposed.

However, when each type of biometric personal authentication is employed singly, the following problems arise:

(1) the authentication performance is limited, and (2) a certain user may fail to join the authentication system due to injury of the biological spot used for authentication and the like.

As for the problem (1), some techniques have been proposed for improving the authentication performance by integrating a plurality of types of biological information (see Japanese Laid-Open Patent Publication Nos. 8-16788, 11-253426, 11-306351 and 2000-242786, for example).

In Japanese Laid-Open Patent Publication No. 8-16788, a plurality of types of biological information are acquired from a person to be authenticated. Feature parameters captured are divided into a plurality of categories. The categories are respectively weighted according to the degree of distinction of the features of the person from others and then integrated. The integrated result is compared with a threshold to thereby identify the person.

In Japanese Laid-Open Patent Publication No. 11-253426, a comparison score vector is generated using the number of comparison scores for each biological feature comparing section as the number of dimensions, and classified into either a "valid" or "invalid" category using linear discrimination, quadratic discrimination, a neural network or statistical probability in a vector space.

In Japanese Laid-Open Patent Publication No. 11-306351, a plurality of comparison scores for each biological feature comparing section are normalized with respective probabilities and integrated using the weighted sum or weighted product of the probabilities.

In Japanese Laid-Open Patent Publication No. 2000-242786, a plurality of authentication results for each biological feature comparing section, which correspond to "valid" or "invalid", are integrated using logical OR or logical AND.

All of the above conventional techniques focus on how to integrate authentication results determined from a plurality of types of biological information. In other words, while these are techniques relating to "multimodal authentication" using a plurality of types of biological information in combination, the types of biological information used are predetermined and all the types of biological information must be acquired invariably during authentication as a premise. The technique described in Japanese Laid-Open Patent Publication No. 8-16788 adopts weighting for a category in which a feature of the person is less distinctive, so that such a category is not reflected in the authentication criteria. However, during authentication, all the types of biological information must be entered as a premise.

The problem (2) that a certain user may not use some biological information will then be discussed.

Suppose a user has a finger unsuitable for fingerprint authentication (for example, the fingerprint pattern is unclear due to a chemical or friction, or the user has a dry skin unfit for a semiconductor fingerprint sensor). In the conventional techniques, the user must enter a plurality of types of biological information including "fingerprint" predetermined for an authentication device during authentication without being notified of the fact that his or her fingerprint is unfit for the authentication. This impairs the convenience of the user.

In addition, the number of types of biological information entered may be reduced when part of the biological information of the user is unfit for authentication, or some type of biological information is temporarily unusable due to injury and the like. In such a case, attainment of the effect characterizing the "multimodal authentication", that is, improving the authentication performance by use of a plurality of types of biological information in combination, may become difficult, and thus the authentication performance may be deteriorated.

The number of types of biological information entered may also be reduced when entry of some type of biological information is difficult under certain circumstances, such as that entry of "voiceprint" is difficult under noisy circumstances. In such a case, also, the problem described above may occur and the authentication performance may be deteriorated.

SUMMARY OF THE INVENTION

An object of the present invention is providing a personal authentication method and device using a plurality of types of biological features, capable of improving the convenience of the user and suppressing influence of deterioration in authentication performance from occurring.

The personal authentication method using biological information of the present invention uses a biological feature database storing feature information of a plurality of types of biological features and information on the relationship between the combination of biological features used for authentication and authentication precision, for persons including at least a person to be authenticated. The method includes the steps of: acquiring feature information of at least one type of biological feature among the plurality of types for the person to be authenticated; performing authentication using the acquired feature information and the feature information of the corresponding biological feature stored in the biological feature database; and determining authentication precision for the authentication based on a combination of biological features related to the acquired feature information by referring to the biological feature database.

According to the invention described above, all types of biological information registered during registration are not necessarily entered during authentication, but only part of biological information may be entered. This permits the user to select types of biological information to be used flexibly depending on the state of his or her biological features, the surrounding environment and the like. Even when only part of biological information is entered, the authentication precision can be determined for the combination of biological features entered. Therefore, it is possible to control the operation of the person to be authenticated according to the authentication precision determined. In this way, influence of deterioration in authentication performance can be suppressed from occurring, and thus damage due to erroneous authentication if any can be minimized.

Alternatively, the personal authentication method using biological information of the present invention includes the steps of: acquiring feature information of a plurality of types of biological features for a user; registering the acquired feature information as information for authenticating the user; and estimating authentication precision for each combination of biological features used for authentication based on the acquired feature information.

According to another aspect of the invention, a personal authentication device using biological information is provided, which uses a biological feature database storing feature information of a plurality of types of biological features and information on the relationship between the combination of biological features used for authentication and authentication precision, for persons including at least a person to be authenticated. The device includes: means for acquiring feature information of at least one type of biological feature among the plurality of types for the person to be authenticated; means for performing authentication using the acquired feature information and the feature information of the corresponding biological feature stored in the biological feature database; and means for determining authentication precision for the authentication based on a combination of biological features related to the acquired feature information by referring to the biological feature database.

According to the invention described above, all types of biological information registered during registration are not necessarily entered during authentication, but only part of biological information may be entered. This permits the user to select types of biological information to be used flexibly depending on the state of his or her biological features, the surrounding environment and the like. Even when only part of biological information is entered, the authentication precision can be determined for the combination of biological features entered. Therefore, it is possible to control the operation of the person to be authenticated according to the authentication precision determined. In this way, influence of deterioration in authentication performance can be suppressed from occurring, and thus damage due to erroneous authentication if any can be minimized.

Alternatively, the personal authentication device of the present invention includes: an input section permitting entry of information of a plurality of types of biological features; a selection input section permitting a user to select biological features of which information is to be entered via the input section; and a display section for displaying an authentication level of the authentication determined according to the combination of the biological features selected via the selection input section.

According to the invention described above, the authentication level corresponding to each combination of biological features selected is displayed on the display section. This greatly improves the convenience of the user.

Alternatively, the personal authentication device of the present invention includes: an input section permitting entry of information of a plurality of types of biological features; and a display section for displaying information on the relationship between the combination of biological features of which information can be entered via the input section and the authentication level.

According to the invention described above, information on the relationship between the combination of biological features of which information can be entered and the authentication level is displayed on the display section. This greatly improves the convenience of the user.

Alternatively, the present invention is directed to a personal authentication method using biological information as follows. During registration, the method comprises the steps of: acquiring information of a plurality of types of biological features from a user; extracting feature information from the acquired information; and estimating authentication precision for each combination of biological features related to the acquired information. During authentication, the method comprises the steps of: acquiring information of at least one type of biological feature among the plurality of types from the user; extracting feature information from the acquired information; performing authentication using the extracted feature information and the feature information extracted during registration for the corresponding biological feature; and controlling operation of the user according to the authentication precision estimated during registration for a combination of biological features related to the acquired information.

BRIEF DESCRIPTION OF THE DRAWINGS

FIG. 8 is an example of information on the relationship between the combination of biological features and the entrance-permitted rooms.

FIG. 10 is an example of information on the relationship between the combination of biological features and the upper amount limit in electronic commerce.

DESCRIPTION OF THE PREFERRED EMBODIMENTS

Figure 1:
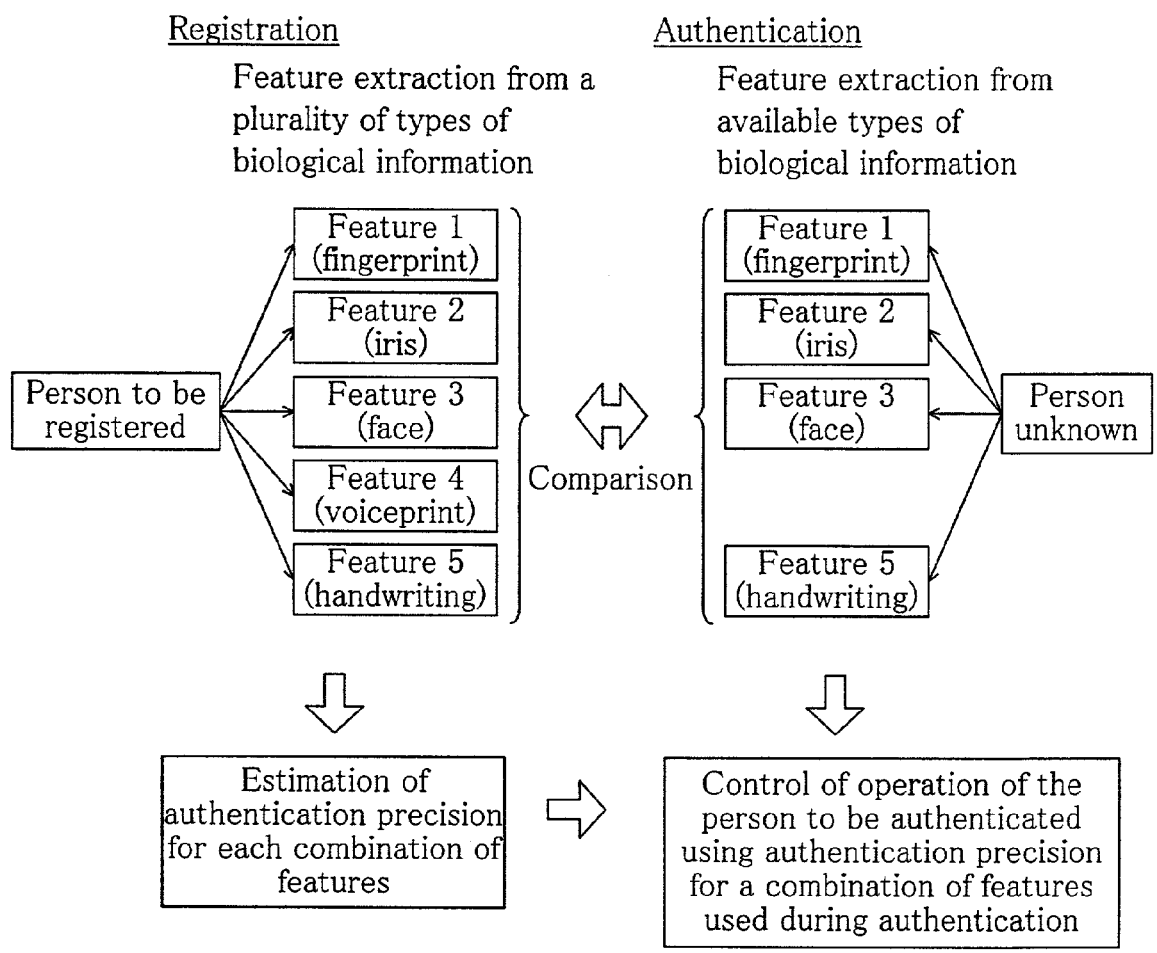
FIG. 1 is a conceptual illustration of a technical feature of the personal authentication according to the present invention.

FIG. 1 is a conceptual illustration of a technical feature of the personal authentication according to the present invention. As shown in FIG. 1, during registration, feature information is extracted from each of a plurality of types of information of biological features for each person to be registered. At this extraction, "authentication precision" is estimated for each combination of pieces of feature information extracted from the types of biological information, and the estimated "authentication precision" is stored. The "authentication precision" as used herein is an indicator of the extent to which the person is distinguishable from others when certain feature information (or a combination of pieces of feature information) is used for authentication. Actual examples of such an indicator will be described later.

During authentication, feature information is extracted from each of types of biological information obtainable during authentication, and compared with the feature information stored during registration, to execute personal authentication. By this authentication, the operation of the person to be authenticated is controlled according to the authentication precision previously estimated during registration for the combination of biological features used for the authentication. Therefore, even if the authentication precision is low due to a shortage of usable biological features during authentication, it is possible to suppress influence of deterioration in authentication performance from occurring, and thus damage from erroneous authentication if any can be minimized.

Embodiment 1

Figure 2:
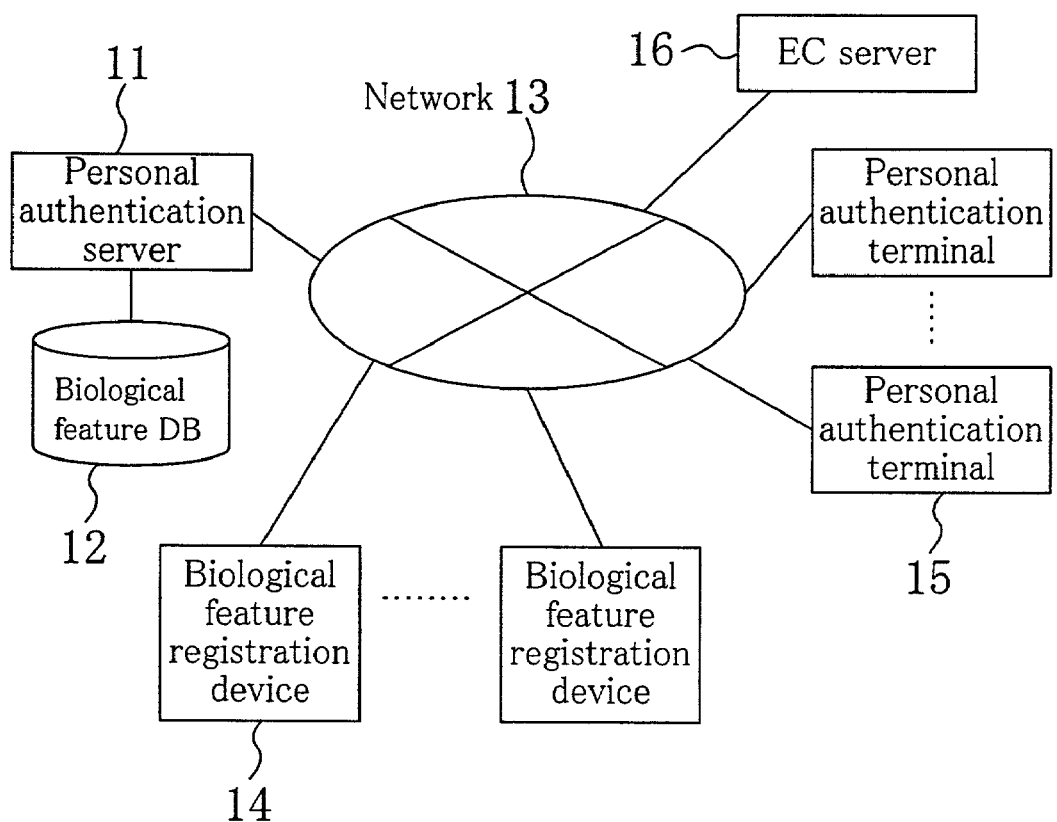
FIG. 2 is a schematic block diagram of a personal authentication system of Embodiment 1 of the present invention.

FIG. 2 is a schematic block diagram of a personal authentication system of Embodiment 1 of the present invention. Referring to FIG. 2, a personal authentication server 11 as a personal authentication device, having a biological feature database (DB) 12 storing biological feature data of a plurality of persons, is connected to a network 13 such as the Internet, private lines and public lines. Also connected to the network 13 are at least one biological feature registration device 14 for entry of information of biological features during registration and at least one personal authentication terminal 15 for entry of information of biological features during authentication.

A plurality of personal authentication servers 11 may be provided, for placement in respective areas or organizations using the network and/or for placement of mirror servers for dispersing the load. The biological feature DB 12 may be connected to the personal authentication server 11 via the network 13. The function of the biological feature registration device 14 may be incorporated in the personal authentication server 11, or the personal authentication terminal 15 may have both functions of registration and authentication. When a plurality of personal authentication terminals 15 are provided, the specifications of the terminals (such as the type of an incorporated input device) are not necessarily the same.

Figure 3:
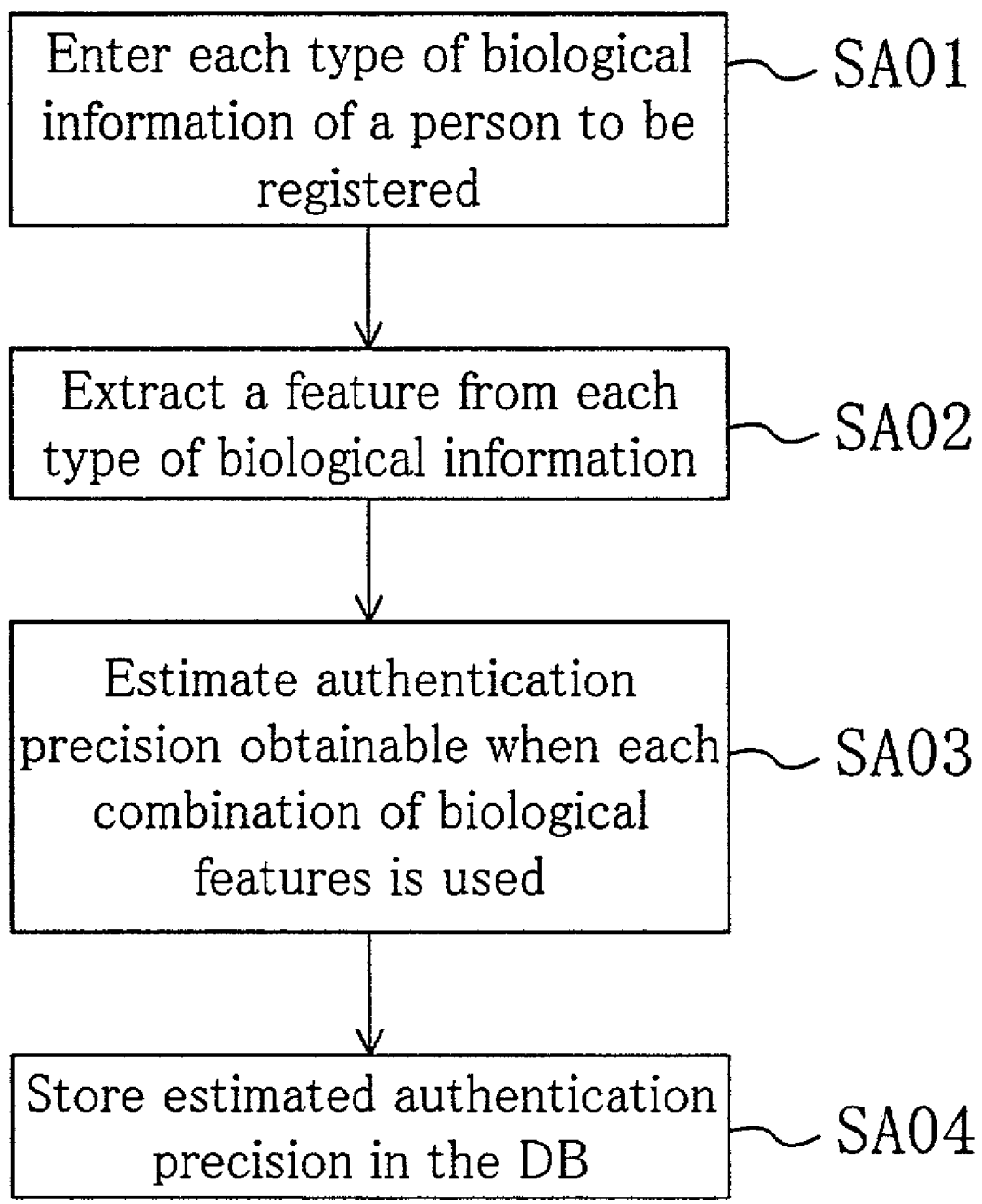
FIG. 3 is a flowchart of processing during registration in a personal authentication method of Embodiment 1 of the present invention.
Figure 4:
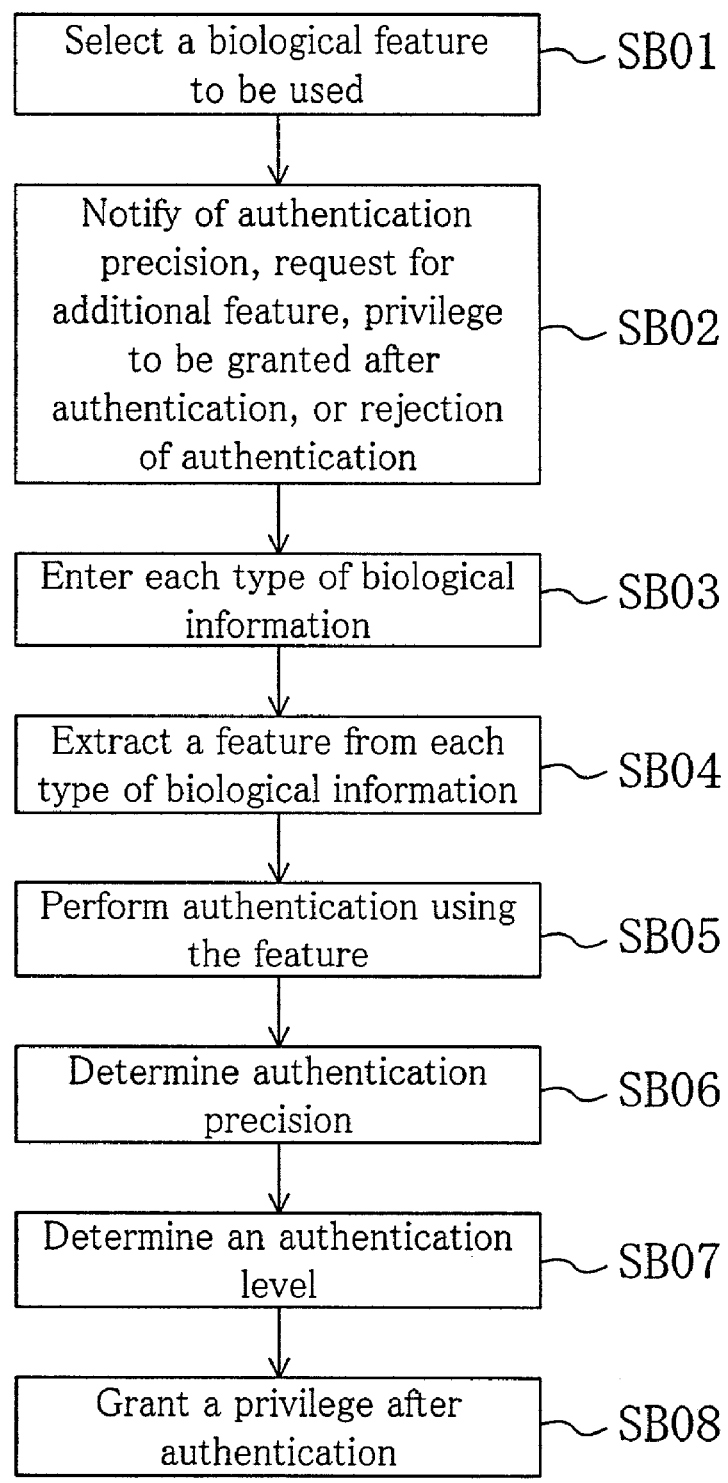
FIG. 4 is a flowchart of processing during authentication in the personal authentication method of Embodiment 1 of the present invention.

FIGS. 3 and 4 are flowcharts of processing during registration and processing during authentication, respectively, in the personal authentication method of this embodiment. Hereinafter, the processing flows during registration and during authentication of the personal authentication of this embodiment will be described separately.

<Registration>

Referring to FIG. 3, during registration, a plurality of types of information on biological features of a person to be registered is entered via the biological feature registration device 14 (step SA01). In this embodiment, assume that five types of information of biological features, "fingerprint", "iris", "face", "voiceprint" and "handwriting", are entered. The biological feature registration device 14 is equipped with an input device for each biological feature. For example, a semiconductor (or optical) fingerprint scanner and the like are provided for "fingerprint". Likewise, an illuminator, a camera and the like are provided for "iris" and "face", a microphone and the like are provided for "voiceprint", and a tablet and the like are provided for "handwriting".

The biological feature registration device 14 then extracts feature information to be used for authentication from each type of the entered biological information (step SA02). The feature extraction may be made by a technique generally known for each type of biological information. Naturally, for improvement of the performance of the entire authentication system, it is desirable to employ a feature extraction technique capable of providing higher authentication performance when used singly for each biological feature.

When the respective numbers of dimensions of the extracted pieces of feature information for "fingerprint", "iris", "face", "voiceprint" and "handwriting" are d1, d2, d3, d4 and d5, the total number of dimensions da is represented by $$da = d1 + d2 + d3 + d4 + d5.$$

If the pieces of feature information are expressed in different representations such as floating-point representation including "double" and "float" and integer representation, they are converted to a same representation. In this embodiment, assume that all the pieces of feature information are converted to N-gradation integer representation. Note that they are also normalized to attain constant variance for all the dimensions. The normalization is made to ensure that the dimensions equally influence the entire identification performance in the respective pieces of feature information.

The entry of biological information and the feature extraction (steps SA01 and SA02) described above are performed for all persons to be registered. The extracted feature information is sent to the personal authentication server 11. The step SA02 for extracting feature information from biological information may be executed by the personal authentication server 11. In this case, the biological information entered into the biological feature registration device 14 is sent to the personal authentication server 11.

The personal authentication server 11 estimates authentication precision for each combination of biological features related to the received feature information (including use of a single piece of feature information) (step SA03). Estimation of the authentication precision is performed in the following manner.

Figures 5, 6:
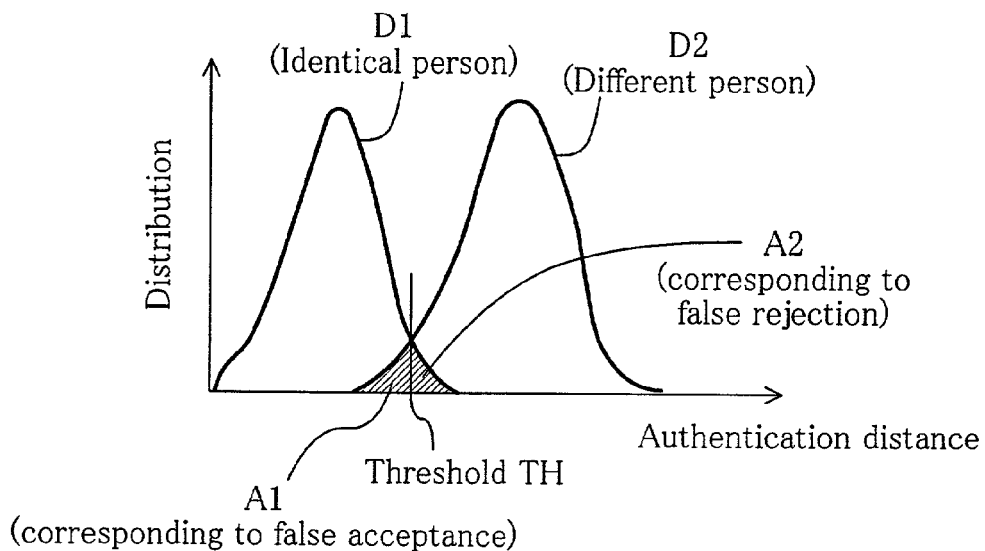
FIG. 5 is a conceptual view of a distribution of authentication distances between identical persons and a distribution of authentication distances between different persons.
FIG. 6 is an example of information on the relationship between the combination of biological features and the authentication precision.

FIG. 5 is a conceptual view of a distribution D1 of authentication distances between identical persons and a distribution D2 of authentication distances between different persons, for some feature information. The distributions of FIG. 5 are prepared for each person. Assuming that the distributions of FIG. 5 are for person P, the distribution D1 represents authentication distances between person P and person P, while the distribution D2 represents authentication distances between person P and all of the persons other than person P. The authentication distance as used herein refers to a value obtained by comparing pieces of feature information on the same combination of biological features extracted from biological information with each other with some distance scale. For example, assuming that the total number of dimensions of the combination of biological features is D and the distance scale is a euclidean distance, the euclidean distance in the D dimensional space is the authentication distance. The authentication distance is small between pieces of feature information of an identical person, while it is large between pieces of feature information of different persons. When the dimensions of the feature information are expressed in binary representation, a hamming distance of da-dimensional binary vector obtained by simply combining all bits may be used as the authentication distance.

When similarity or a correlation value is used in place of the distance, the value is large between pieces of feature information of an identical person, while it is small between pieces of feature information of different persons.

Alternatively, it is possible to adopt learning of a neural network capable of identifying a given person from others in the da-dimensional space. From values output from the neuron when data used for the learning are input, a value representing the reliability of the result of identification of a given person from others is calculated. The calculated value (reliability) may be used as the authentication distance.

Likewise, a linear discrimination function or a quadratic discrimination function capable of identifying a given person from others may be calculated in the da-dimensional space, and the distance of data used for the calculation of the function from the discrimination plane (hyperplane) thereof may be used as the authentication distance. In a simple euclidean distance, all the dimensions are equally weighted. By defining the discrimination function as described above, however, dimensions usable for identification can be distinguished from those unusable for identification by the coefficient of the discrimination function. This is therefore convenient for the identification.

In this embodiment, feature information was newly prepared by combining pieces of feature information extracted from types of biological information, and identification of a given person from others was performed using the newly prepared feature information. Alternatively, identification may be performed for each biological feature (different identification methods may be employed for the biological features). Authentication distances (or values conforming thereto) are obtained by the identification for the respective biological features and normalized. Using the normalized authentication distances as the respective dimensions, an authentication distance vector is prepared. A distance scale capable of further identifying a given person from others is defined in the prepared authentication distance vector space, to use the distance scale as the authentication distance.

When a threshold TH for identifying a given person from others is set as shown in FIG. 5, the part of the distribution D2 for different persons smaller in authentication distance than the threshold TH (hatched part A1) corresponds to a "false acceptance" part in which a different person may be mistakenly accepted. Therefore, from a distribution as that shown in FIG. 5, the false acceptance rate (FAR), the rate at which different persons may be mistakenly accepted, can be "trial-calculated" to some extent.

The part of the distribution D1 for the identical person greater in authentication distance than the threshold TH (hatched part A2) corresponds to a "false rejection" part in which the identical person may be mistakenly rejected as a different person. As the FAR described above, the false rejection rate (FRR), the rate at which the identical person may be mistakenly rejected, can be "trial-calculated" from a distribution as that shown in FIG. 5.

The expression "trial-calculated" are used herein because the FAR and FRR obtained by the above technique are calculated from the distributions of feature information obtained during registration, which are naturally different from FAR and FRR calculated during authentication. Note that as the number of pieces of feature information during registration is greater, the distributions prepared during registration are closer to those prepared during authentication, and thus the trial-calculated FAR and FRR prove to be better estimations of FAR and FRR during authentication.

The FAR and FRR depend on the setting of the threshold TH, and the threshold TH can be arbitrarily determined depending on the purpose of authentication. For example, if it is desired to reject others without fail, the threshold TH may be set lower trading off a more or less increase in false rejection rate FRR (the threshold is shifted leftward as is viewed from FIG. 5). If rejection of the identical person causes much difficulty from the standpoint of user interface, the threshold TH may be set higher trading off the false acceptance rate FAR (the threshold is shifted rightward as is viewed from FIG. 5).

In this embodiment, assume that the threshold TH is set so that the trial-calculated FAR and FRR are equal to each other (the areas of A1 and A2 are equal to each other). Naturally, the threshold TH may be set in a different way. For example, it may be set at the position at which the distribution D1 for the identical person and the distribution D2 for different persons intersect each other, or at the position at which the FAR or FRR becomes a predetermined value.

If the registered data amount in the biological feature DB 12 is not sufficiently large, the two distributions D1 and D2 may not overlap each other, unlike those shown in FIG. 5. In this case, the two distributions may be approximated with an appropriate function such as Gaussian function to form an overlap portion thereof and then determine the threshold TH.

This embodiment is based on the premise that the distribution D1 for the identical person is usable. To make the distribution D1 usable, a plurality of pieces of feature information are necessary for one person. To obtain a plurality of pieces of feature information efficiently, the following method may be employed when a camera is used as the input device.

When the feature is "face", for example, a moving picture of a face may be taken for several seconds, and frame images of the moving picture may be extracted for use as registered images. For example, when a moving picture of a face is taken for three seconds with a 30 frames/sec progressive,-canning camera, a total of 90 face images are obtained. After defective images such as that taken when the person blinks are removed, the remaining images can be used as images for registration. If the moving picture is taken with the position of the illuminator being shifted, brightness of the illuminator being changed, or the position of the camera being shifted delicately, face images taken under various conditions can be obtained.

As for the "voiceprint" using a microphone and the "handwriting" using a tablet, biological information must be entered a plurality of times to obtain a plurality of pieces of feature information.

The distribution D1 for the identical person can be updated by adding duly authenticated feature information to the biological feature DB 12 every time the person is authenticated.

In this embodiment, distributions as shown in FIG. 5 are prepared for each combination of pieces of feature information extracted from types of biological information for each user to be registered, to estimate authentication precision. In this embodiment, the value of "1−FAR", that is, the probability with which others are not accepted as the identical person, is adopted as the authentication precision. The threshold TH is set so that the FAR and FRR are equal to each other as described above. Therefore, the authentication precision is also substantially "1−FRR".

Distributions of authentication distances as shown FIG. 5 are prepared for all the combinations of biological features, such as the combination of "fingerprint" and "iris" ((d1+d2) dimensional feature information) and the combination of three types of biological features, "fingerprint", "iris" and "face" ((d1+d2+d3) dimensional feature information), to trial-calculate the authentication precision (1−FAR).

The authentication precision is trial-calculated for each combination of biological features for each user as described above. Therefore, for a person who has an unclear fingerprint due to a chemical or friction, for example, the authentication precision is lower when a combination including "fingerprint" (such as the combination of "fingerprint", "iris" and "face") is used, than when a combination including no "fingerprint" (such as the combination of "iris" and "face") is used.

The reason for the deterioration in authentication precision is that the distribution D1 for the identical person in FIG. 5 is widened due to failure in stable extraction of a fingerprint pattern, resulting in increase in FRR.

The fingerprint of a person may happen to resemble those of many other persons. In this case, also, as in the case described above, the authentication precision may possibly be lower when a combination including "fingerprint" is used than when a combination including no "fingerprint" is used. The reason for this is that the distribution D1 for the identical person and the distribution D2 for different persons become closer to each other because many others have fingerprints resembling the fingerprint of the person in question, resulting in increase in FAR.

Thus, in this embodiment, which combination of biological features is suitable for a given user is easily known from the authentication precisions of the combinations of biological features.

The personal authentication server 11 stores the trial-calculated authentication precisions in the biological feature DB 12 (step SA04). FIG. 6 shows an example of authentication precision information stored in the biological feature DB 12. In FIG. 6, the relationship between the combination of biological features and the authentication precision for person P is shown in the form of a table (In FIG. 6, not only the authentication precision "1–FAR", but also the value FAR is shown for reference). Basically, it is considered that the authentication precision improves as a larger number of biological features are combined. In the example in FIG. 6, however, since the person P happens to have a fingerprint unsuitable for authentication, the authentication precision of "fingerprint" as a single feature is low, and thus the authentication precision of a combination including "fingerprint" rather decreases.

The steps SA03 and SA04 are process steps performed during registration. However, when new feature information is added to the biological feature DB 12 or when the registered feature information for a given person is updated, the steps SA03 and SA04 may be re-executed for data of all the persons. This makes it possible to keep the authentication precisions updated reflecting the new feature information. If execution every registration/updating is not recommendable due to increase in calculation load and the like, execution may be made periodically such as once a week or once a month.

There may be a case where while five types of biological features, "fingerprint", "iris", "face", "voiceprint" and "handwriting" were registered during initial registration, another biological feature registration device 14 equipped with a hand shape input device is available. In this case, it is possible to register "hand shape" using the biological feature registration device 14 at a later opportunity. To state concretely, the entry of biological information (step SA01) and the extraction of feature information (step SA02) are performed only for "hand shape". Authentication precision is estimated for all the combinations including "hand shape" in addition to the existing all combinations (step SA03), and the estimated authentication precisions are stored (step SA03).

When the lowest guaranteed authentication precision X is determined in advance, a combination of which the authentication precision is lower than the value X may not be used for authentication.

It is also possible to notify the person to be registered of any combination of biological features that fails to reach the lowest guaranteed authentication precision after completion of registration, so that each user to be authenticated knows his or her biological features suitable for authentication. In reverse, the user may be notified of a combination of biological features having a high authentication precision as a combination suitable for the user. In the example in FIG. 6, person P may be notified of the combination of "iris", "face", "voiceprint" and "handwriting" as the most effective combination of biological features. It is also possible to set in advance a combination of biological features suitable for a given user as a password.

<Authentication>

Next, the processing during authentication will be described with reference to FIG. 4.

First, the user intending to receive authentication (person to be authenticated) enters his or her personal ID and selects biological features of which information is to be entered into the personal authentication terminal 15 (step SB01). The entered personal ID and the selected types of biological features are sent to the personal authentication server 11 from the personal authentication terminal 15.

Assume herein that the combination of biological features most suitable for the user, of which the user was notified during registration, is selected. In this case, a combination of biological features having a high authentication precision may be set in advance as a password during registration, for example, and whether or not the combination of biological features selected during authentication matches with the combination set as the password for the personal ID may be determined. If they do not match with each other, authentication may not be performed.

Otherwise, the user may select biological features currently available. For example, the user may happen to have injury to the finger of which fingerprint has been registered when he or she intends to be authenticated. In this case, the user may select biological features other than "fingerprint".

The personal authentication terminal 15 may limit the biological features depending on the surrounding environment. For example, surrounding sound may be measured immediately before authentication with a microphone provided in the personal authentication terminal 15. If the surrounding noise level is determined high, "voiceprint" may be eliminated from selection candidates of biological features. As another case, ambient lightness may be measured with a camera or an illumination sensor provided in the personal authentication terminal 15. If the lightness measured exceeds a predetermined threshold, influence of external light such as sunlight is determined great, and thus "face" and "iris" may be eliminated from the selection candidates.

The biological features may be limited depending on the type of sensor incorporated in the personal authentication terminal 15. For example, when the personal authentication terminal 15 is of a cellular phone type equipped with a camera, a fingerprint sensor and a microphone but not equipped with a tablet, "handwriting" is eliminated from the selection candidates of biological features.

Next, once the personal authentication server 11 receives the personal ID and the types of biological features from the personal authentication terminal 15, it determines the authentication precision expected for the combination of the selected biological features by referring to information such as that shown in FIG. 6 stored in the biological feature DB 12 (step SB02). The determined authentication precision is sent to the personal authentication terminal 15 for presentation to the user. If the level (threshold) of authentication precision required for authentication has been determined in advance, the personal authentication server 11 determines whether or not the authentication precision exceeds the threshold. If the authentication precision fails to exceed the threshold, the personal authentication server 11 requests the user to reselect biological features via the personal authentication terminal 15.

For example, consider the case that biological features excluding "voiceprint" have been selected because the surrounding noise level is high, but the authentication precision required for the authentication is not attained without "voiceprint". In this case, the user is urged to perform authentication in a quieter place. As another example, consider the case that biological features excluding "face" and "iris" have been selected because the environment is largely influenced by external light, but the authentication precision required for the authentication is not attained without at least one of "face" and "iris". In this case, the user is urged to perform authentication in the shade. Likewise, consider the case that biological features excluding "handwriting" have been selected because the personal authentication terminal 15 is not equipped with a tablet, but the authentication precision required for the authentication is not attained without "handwriting". In such a case, the user is asked to perform authentication with another personal authentication terminal 15 equipped with a tablet.

If the determined authentication precision fails to exceed a predetermined threshold, authentication of the user itself may be rejected.

The privilege granted to the user after authentication according to the determined authentication precision, that is, "authentication level" may be presented to the user.

For example, when the purpose of the authentication is to identify a person in electronic commerce, the upper limit of allowed transaction amount may be determined according to the determined authentication precision, and the user may be notified of the upper amount limit. As another example, when the purpose of the authentication is logging in to a PC or the like, executable commands (such as browsing only, rewritable and erasable) or accessible sites and directories may be determined according to the authentication precision, and the user may be notified of these commands or sites and directories.

Thereafter, the person to be authenticated actually enters biological information of the selected biological features via the personal authentication terminal 15 (step SB03). The personal authentication terminal 15 extracts feature information from the entered biological information of the person to be authenticated (step SB04). The extracted feature information is sent from the personal authentication terminal 15 to the personal authentication server 11.

The personal authentication server 11 performs authentication using the received feature information and feature information of the corresponding biological information stored in the biological feature DB 12 (step SB05). For example, the received pieces of feature information are combined, and identification of the person is performed in the feature space of the combined pieces of feature information. Alternatively, authentication is made by comparing the received pieces of feature information with the corresponding registered pieces of feature information. Together with the authentication, authentication precision for this authentication is determined based on the combination of biological features related to the currently acquired feature information, with reference to the biological feature DB 12 (step SB06). For example, authentication precision is determined with reference to information on the relationship between the combination of biological features and the authentication precision as that shown in FIG. 6.

Once the person to be authenticated is identified as the identical person, the personal authentication server 11 determines the authentication level based on the authentication precision (step SB07). For example, the upper amount limit in electronic commerce, usable commands or sites, a room the person is permitted to enter, or the like is determined. Thereafter, the privilege after authentication is granted. For example, a key corresponding to the determined upper amount limit is issued for an EC server 16.

Thus, in this embodiment, all types of biological information registered during registration are not necessarily entered during authentication, but only part of them may be entered. This permits the user to select types of biological information used flexibly depending on the state of his or her biological features, the surrounding environment and the like. The authentication precision can be determined for the combination of biological features entered even when only part of the types of biological information is entered. The authentication level is determined according to the determined authentication precision. In this way, influence of deterioration in authentication performance can be suppressed from occurring, and thus damage due to erroneous authentication if any can be minimized.

It is possible to omit the process step SB01 for selecting biological features used and the process step SB02 for presenting the authentication precision and the authentication level corresponding to the combination of the selected biological features.

Although the process step SB04 for extracting feature information from biological information was executed by the personal authentication terminal 15 in this embodiment, it may be executed by the personal authentication server 11. In this case, the biological information is sent from the terminal 15 to the personal authentication server 11.

Embodiment 2

Figure 7:
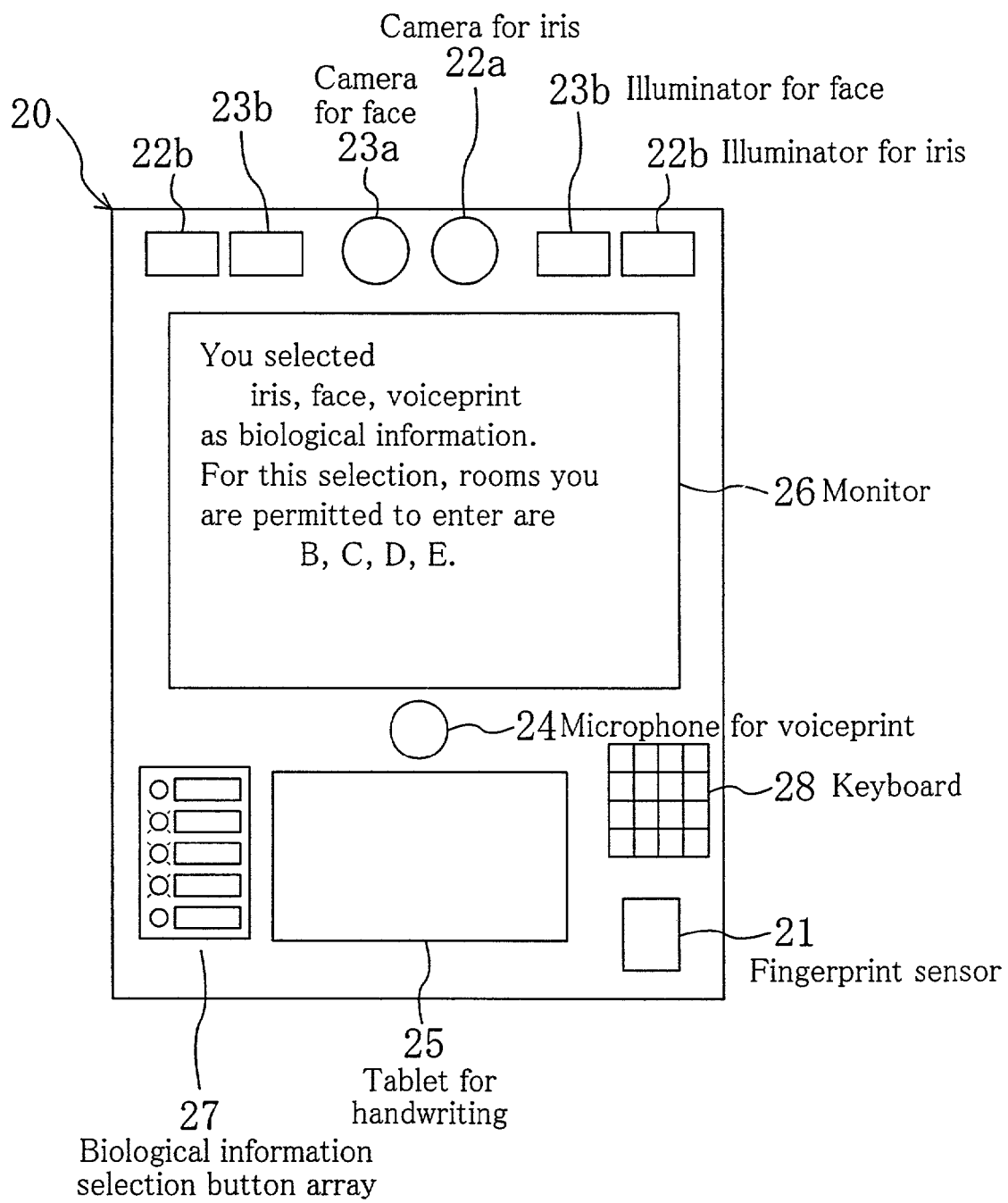
FIG. 7 is an appearance of a personal authentication device of Embodiment 2 of the present invention.

FIG. 7 is a schematic illustration of a personal authentication device of Embodiment 2 of the present invention. The personal authentication device of this embodiment, denoted by the reference numeral 20, functionally corresponds to integration of the functions of the personal authentication server 11, the biological feature DB 12, the biological feature registration device 14 and the personal authentication terminal 15 shown in FIG. 2.

In this embodiment, assume that the personal authentication device 20 of FIG. 7 is used for entrance/exit control of a facility such as a building. More specifically, personal authentication is performed using a plurality of types of information of biological features, and based on the authentication results, control of entrance/exit to rooms in a facility (operation of locking/unlocking) is performed. In this embodiment, as in Embodiment 1, assume that five types of biological features, "fingerprint", "iris", "face", "voiceprint" and "handwriting", are usable.

The personal authentication device 20 includes a fingerprint sensor 21, a camera 22*a* and an illuminator 22*b* for an iris, a camera 23*a* and an illuminator 23*b* for a face, a microphone 24 for voiceprint, and a tablet 25 for handwriting. The personal authentication device 20 further includes a monitor 26 as a display section, a keyboard 28, and a biological information selection button array 27 as a selection input section.

Hereinafter, the flows of processing during registration and during authentication of the personal authentication of this embodiment will be described separately. The flows of processing are broadly similar to those in Embodiment 1.

<Registration>

During registration, the manager of the personal authentication device 20 manages registration of users. Authentication of the manager himself or herself is made by password entry via the keyboard 28 or by authentication using biological information with the personal authentication device 20. After the manager has dealt with registration work and entry of the ID of a user, the user enters a plurality of types of biological information.

Feature information used for authentication is then extracted from each of the entered types of biological information. The extraction method is as described in Embodiment 1. The entry of biological information and feature extraction as described above are performed for all users to be registered.

The authentication precision is then estimated for each combination of pieces of feature information extracted from the types of biological information (including use of a single piece of feature information). The method for estimating the authentication precision is as described in Embodiment 1. The estimated authentication precision is stored in a memory (not shown) of the personal authentication device 20 as is stored in the biological feature DB 12 in Embodiment 1.

FIG. 8 is an example of information on the relationship between the combination of biological features used for authentication and the authentication precision, stored in the memory. In FIG. 8, entrance-permitted rooms are also shown as the authentication level together with the authentication precision.

<Authentication>

Figure 9:
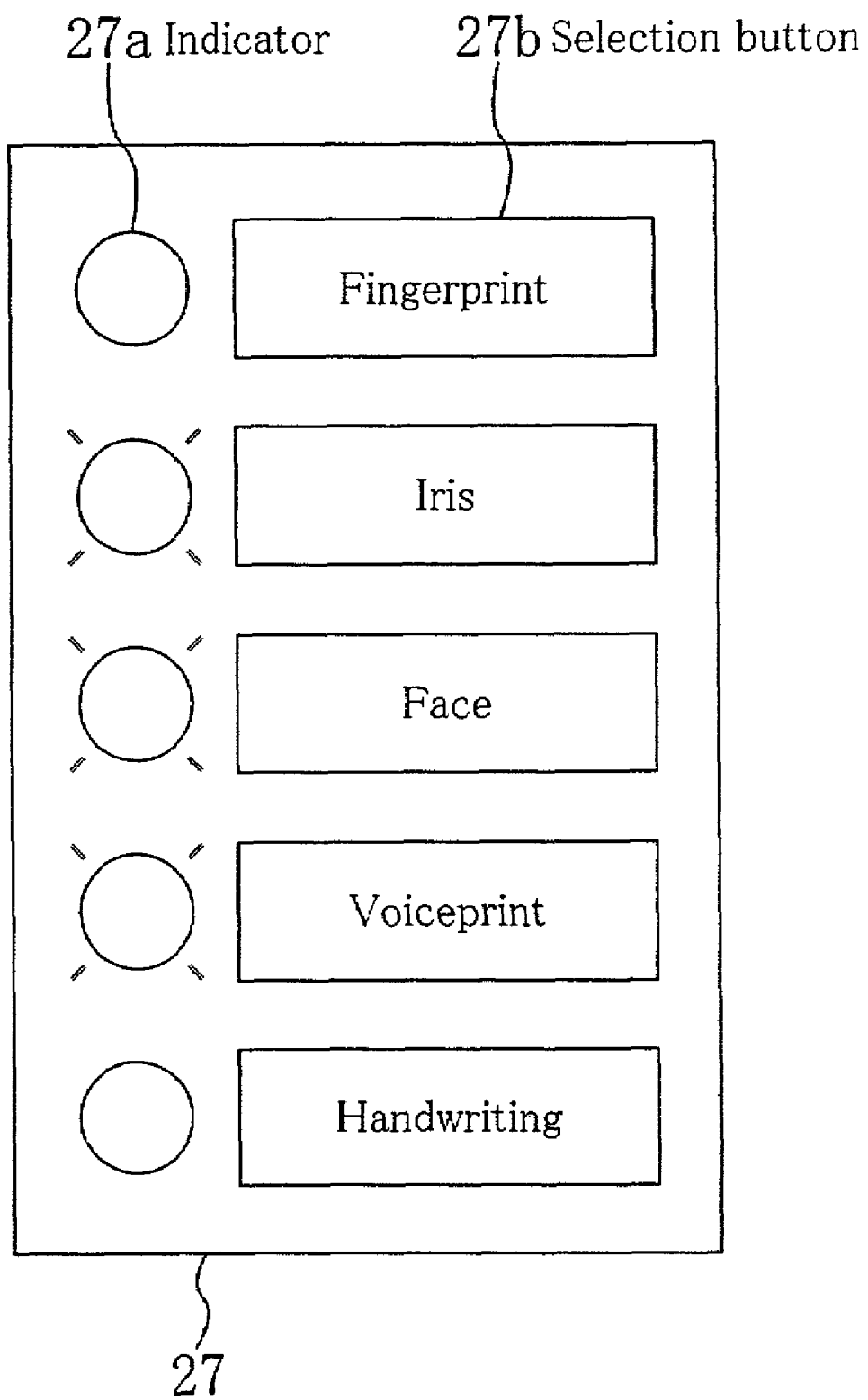
FIG. 9 is an illustration of details of biological information selection buttons of the personal authentication device of FIG. 7.

During authentication, the user to be authenticated enters his or her ID via the keyboard 28 and selects types of biological information intending to enter via the biological information selection button array 27. FIG. 9 is an enlarged view of the biological information selection button array 27 in FIG. 7. When the user presses a selection button 27b corresponding to the type of biological information intending to select, an indicator 27a for the pressed selection button 27b lights up to indicate the selection. In the example of FIG. 9, "iris", "face" and "voiceprint" have been selected. In this way, since the types of biological information are selectable, a user who happens to have injury to the finger of which fingerprint has been registered can select types of biological information other than "fingerprint".

Once types of biological information are selected, the personal authentication device 20 determines an authentication level expected for the selected types of biological information by referring to information stored during registration as that shown in FIG. 8, and displays the determined authentication level on the monitor 26 for presentation to the user. Since "iris", "face" and "voiceprint" have been selected in the illustrated example, it is displayed that entrance to four rooms B, C, D and E is permitted, from the information in FIG. 8.

The user, who has confirmed the authentication level on the monitor 26, actually enters the selected types of biological information. In the illustrated example, the user enters "iris" information with the camera 22a and the illuminator 22b for an iris, enters "face" information with the camera 23a and the illuminator 23b for a face, and enters "voiceprint" information with the microphone 24 for voiceprint. If the authentication level displayed on the monitor 26 is found insufficiently low, types of biological information may be re-selected.

Once the biological information is entered, the personal authentication device 20 extracts feature information from each of the entered types of biological information, and compares the extracted feature information with the registered feature information, to authenticate the user.

When the user is authenticated as the identical person, the operation of the user is controlled according to the authentication level. In the illustrated example, rooms B, C, D and E are unlocked.

The user may select the combination of biological features of which the user has been notified as most suitable during registration. In this case, the notified combination of biological features may be preset as a password with the personal authentication device 20, and authentication may not be executed if the combination of the selected biological features fails to match with the combination preset as the password.

The personal authentication device 20 may limit the usable biological features depending on the surrounding environment. For example, surrounding sound may be measured immediately before authentication with the microphone 24. If the surrounding noise level is determined high, "voiceprint" may be eliminated from selection candidates of biological features. Likewise, if ambient lightness measured with the camera 22a or 23a or an illumination sensor (not shown) exceeds a predetermined threshold, influence of external light such as sunlight is determined great, and thus, "face" and "iris" may be eliminated from the selection candidates. In this case, the user may be informed of selectable biological features by lighting up of the indicators 27a or the like.

The display section such as the monitor 26 may display the information on the relationship between the combination of usable biological features and the authentication level. For example, in this embodiment, in which the purpose of the authentication is control of entrance/exit, information as shown in FIG. 8 may be displayed on the monitor 26, to notify the user of entrance-permitted rooms. In this case, display of the authentication precision is not necessarily required.

When the purpose of the authentication is identification of the user in electronic commerce, information as shown in FIG. 10 on the relationship between the combination of biological features and the upper amount limit in electronic commerce may be displayed on the monitor 26, for notification to the user. Otherwise, when the purpose of the authentication is logging in to a PC or the like, the relationship between the combination of biological features and the usable commands or sites may be displayed on the monitor 26.

The display section may be composed of a means other than the monitor 26, such as an indicator. The selection entry section may be composed of a means other than the selection button array 27, such as a touch panel.

Thus, the integrated personal authentication device of this embodiment can obtain substantially the same effect as that described in Embodiment 1. In this embodiment, the display section is provided for displaying the authentication level according to the combination of selected biological features and information on the relationship between the combination of usable biological features and the authentication level. Therefore, the convenience of the user is greatly improved.

The display section and the selection entry section in this embodiment may be provided for a personal authentication terminal as that shown in Embodiment 1. By this provision, the convenience of the user will be greatly improved as in this embodiment.

The above embodiments were described as using the five types of biological features. Other biological features such as a retina, a blood-vessel arrangement, a hand shape, a palm print, an earflap and DNA may also be used. Alternatively, a non-biometric authentication means such as an IC card and a password may be additionally used.

Thus, according to the present invention, the user can select types of biological information to be used during authentication flexibly depending on the state of his or her biological features, the surrounding environment and the like. The authentication precision can be determined for the entered biological information. Therefore, the operation of the person authenticated can be controlled with the authentication precision. This suppresses deterioration in authentication performance from occurring.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A personal authentication method using biological information, wherein the method is performed on an authentication apparatus, the method comprising the steps of:
    maintaining a biological feature database storing for each user including at least a person to be authenticated: (1) feature information of a plurality of categories of biological features; and (2) resource accessibility potential information table on the relationship between: (a) combination of the plurality of categories of biological features and (b) authentication precision which is a probability that others are not accepted as the user, the probability being obtained by trial-calculating FAR (False Acceptance Rate);
    having the person to be authenticated select at least two of the categories of biological features;
    retrieving authentication precision for the authentication from the biological feature database using the selected combination of categories of biological features as a query;
    determining whether or not the retrieved authentication precision exceeds a threshold required for purposes of authentication, before allowing the user to enter actual feature information into an authentication device;
    requesting the person to be authenticated to reselect at least one of the categories of biological features when the retrieved authentication precision fails to exceed the threshold;
    allowing the person to be authenticated to enter actual feature information of the selected categories of biological features into the authentication device only when the authentication precision exceeds the threshold; and
    performing authentication of the person to be authenticated by comparing the entered feature information and the feature information of the corresponding categories of biological features stored in the biological feature database.

2. A personal authentication method using biological information, wherein the method is performed on an authentication apparatus, the method comprising the steps of:
    using a biological feature database storing for each user including at least a person to be authenticated: (1) feature information of a plurality of categories of biological features; and (2) resource accessibility potential information table on the relationship between: (a) combination of the plurality of categories of biological features and (b) authentication precision which is a probability that others are not accepted as the user, the probability being obtained by trial-calculating FAR (False Acceptance Rate);
    having the person to be authenticated select at least two of the categories of biological features;
    retrieving authentication precision for the authentication from the biological feature database using the selected combination of categories of biological features as a query;
    determining whether or not the retrieved authentication precision exceeds a threshold required for purposes of authentication before allowing the user to enter actual feature information into an authentication device;
    rejecting authentication of the person to be authenticated when the retrieved authentication precision fails to exceed the threshold;
    allowing the person to be authenticated to enter actual feature information of the selected categories of biological features into the authentication device only when the determined authentication precision exceeds the threshold; and
    performing authentication of the person to be authenticated by comparing the entered feature information and the feature information of the corresponding categories of biological features stored in the biological feature database.

3. A personal authentication method using biological information, wherein the method is performed on an authentication apparatus, the method comprising the steps of:
    using a biological feature database storing for each user including at least a person to be authenticated: (1) feature information of a plurality of categories of biological features; and (2) resource accessibility potential information table on the relationship between: (a) combination of the plurality of categories of biological features and (b) authentication precision which is a probability that others are not accepted as the user, the probability being obtained by trial-calculating FAR (False Acceptance Rate);
    having the person to be authenticated select at least two of the categories of biological features;
    retrieving authentication precision for the authentication from the biological feature database using the selected combination of categories of biological features as a query;
    presenting on a display unit resource accessibility potential information, wherein the user is shown a list of resources that may be accessed upon successful authentication based on the selected combination of categories of biological features and the authentication precision corresponding to the selected combination of categories of biological features, and wherein a user is not allowed to enter actual feature information into an authentication device to gain access to a specific resource unless the authentication precision corresponding to the selected combination of categories of biological features exceeds a predetermined threshold;
    allowing the person to be authenticated enter actual feature information of the selected categories of biological features into the authentication device only when the determined authentication precision exceeds the threshold; and
    performing authentication of the person to be authenticated by comparing the entered feature information and the feature information of the corresponding categories of biological features stored in the biological feature database.

4. The personal authentication method using biological information of claim 1 further comprising precluding the authentication of the person to be authenticated until the selected combination of categories of biological features match a preset combination of categories of biological features selected by the person to be authenticated.

5. The personal authentication method using biological information of claim 2 further comprising presetting a password representing a preset combination of categories of biological features and precluding authentication of the person to be authenticated until the selected combination of categories of biological features matches the preset password, wherein the person to be authenticated presets the password by selecting a combination of categories of biological features.

* * * * *